(12) United States Patent
Hachiya et al.

(10) Patent No.: US 7,348,766 B2
(45) Date of Patent: Mar. 25, 2008

(54) SWITCHING POWER SUPPLY DEVICE (75) Inventors: Yoshiaki Hachiya, Otsu (JP); Ryutaro Arakawa, Amagasaki (JP); Minoru Fukui, Takatsuki (JP); Takashi Kunimatsu, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 14 days.

(21) Appl. No.: 11/441,374

(22) Filed: May 25, 2006

(65) Prior Publication Data
US 2006/0273662 A1 Dec. 7, 2006

(30) Foreign Application Priority Data
Jun. 3, 2005 (JP) ............... 2005-163942

(51) Int. Cl.
G05F 1/575 (2006.01)
G05F 1/656 (2006.01)
(52) U.S. Cl. ..................... 323/284; 323/285
(58) Field of Classification Search ............. 323/224, 323/271, 282, 284, 351, 223, 285
See application file for complete search history.

(56) References Cited
U.S. PATENT DOCUMENTS
6,420,858 B1 * 7/2002 Kitagawa et al. .......... 323/282

2003/0112040 A1 6/2003 Yoshimura

FOREIGN PATENT DOCUMENTS
JP 10-191625 7/1998
JP 2000-350440 12/2000
JP 2001-112241 4/2001
JP 2003-189632 7/2003

* cited by examiner

Primary Examiner—Gary L. Laxton
(74) Attorney, Agent, or Firm—RatnerPrestia (57) ABSTRACT The peak current flowing to the switching device drops in a no-load state with PWM control, but because the number of switching operations is constant regardless of the load, further reducing power consumption is difficult. The switching power supply device has a PWM signal generator for generating a PWM signal, a switching device Q1 for switching the first supply voltage VIN based on the PWM signal, converters for outputting the difference between a second supply voltage and a reference voltage as a difference signal, and an intermittent oscillation control circuit for stopping the switching operation of the first switching device when the difference signal is less than a predetermined first threshold value (Vp1). The PWM signal generator changes the pulse width based on the difference signal to generate the PWM signal.

28 Claims, 12 Drawing Sheets

SWITCHING POWER SUPPLY DEVICE

BACKGROUND OF THE INVENTION

1. Field of Technology

The present invention relates to a switching power supply device, and relates more particularly to an apparatus that enables power conservation during standby mode operation and high efficiency during operation at a rated load.

2. Description of Related Art

Figure 9:
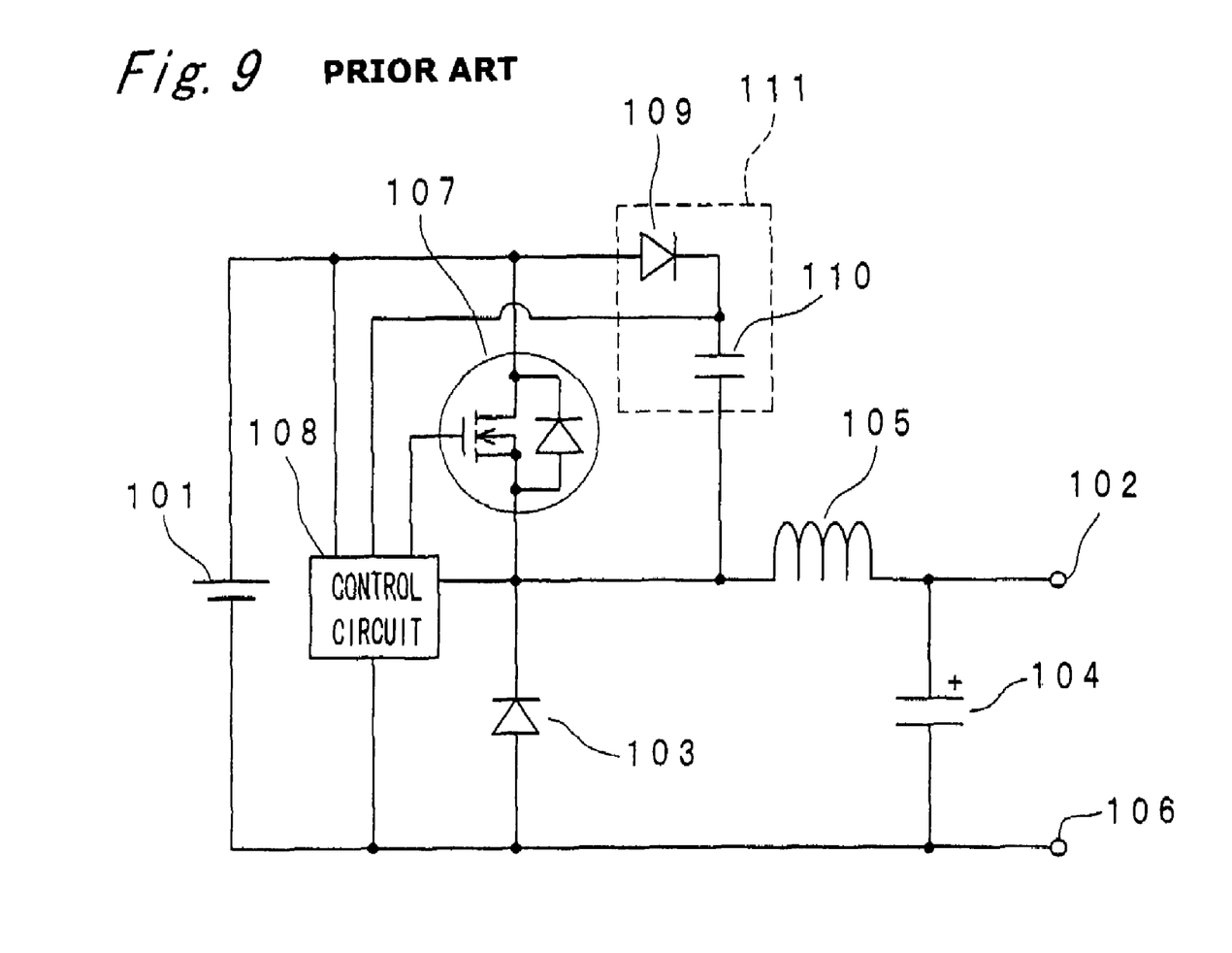
FIG. 9 is a block diagram of a switching power supply according to a first example of the prior art.
Figure 10:
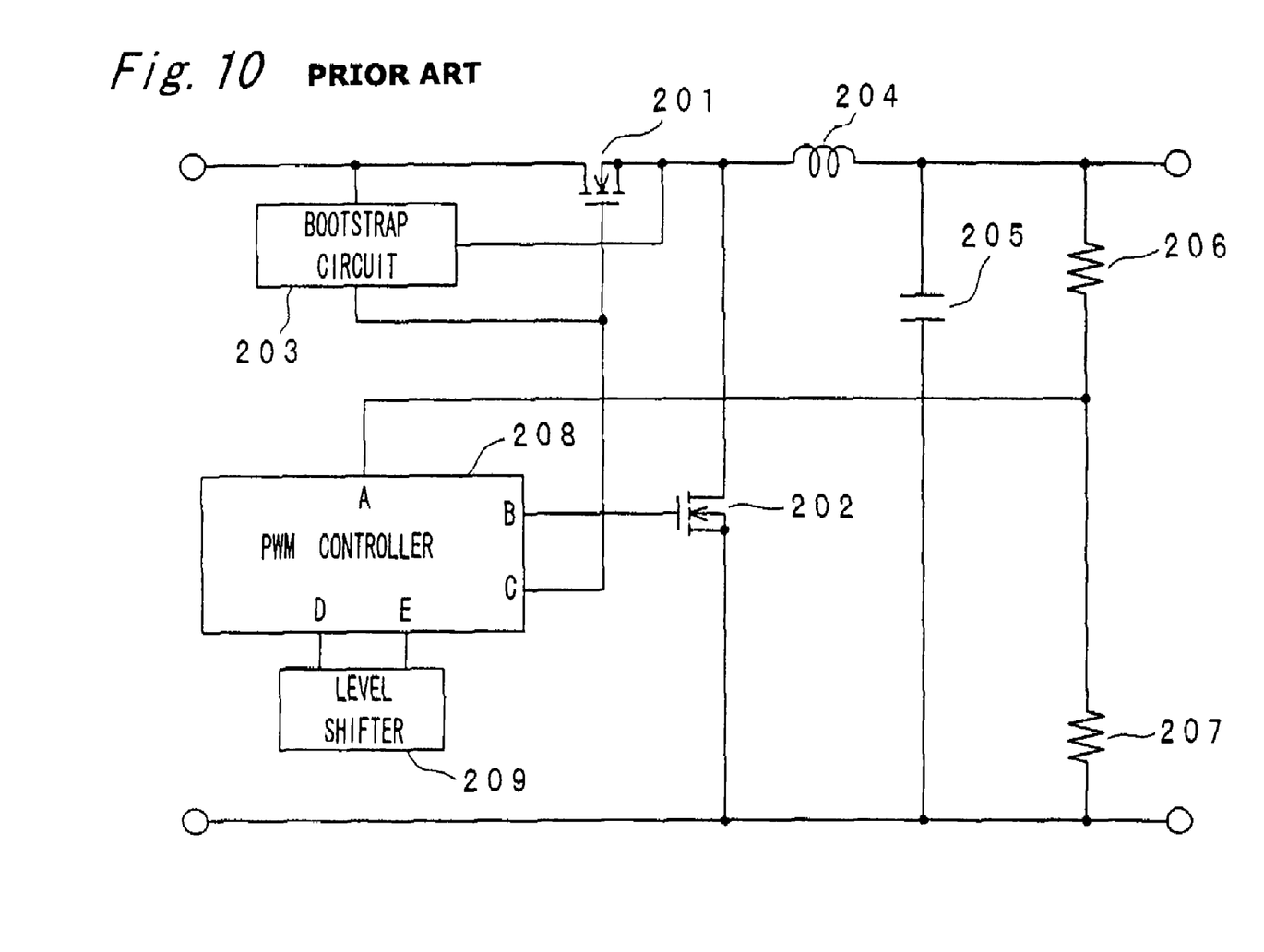
FIG. 10 is a block diagram of a switching power supply according to a second example of the prior art.
Figure 11:
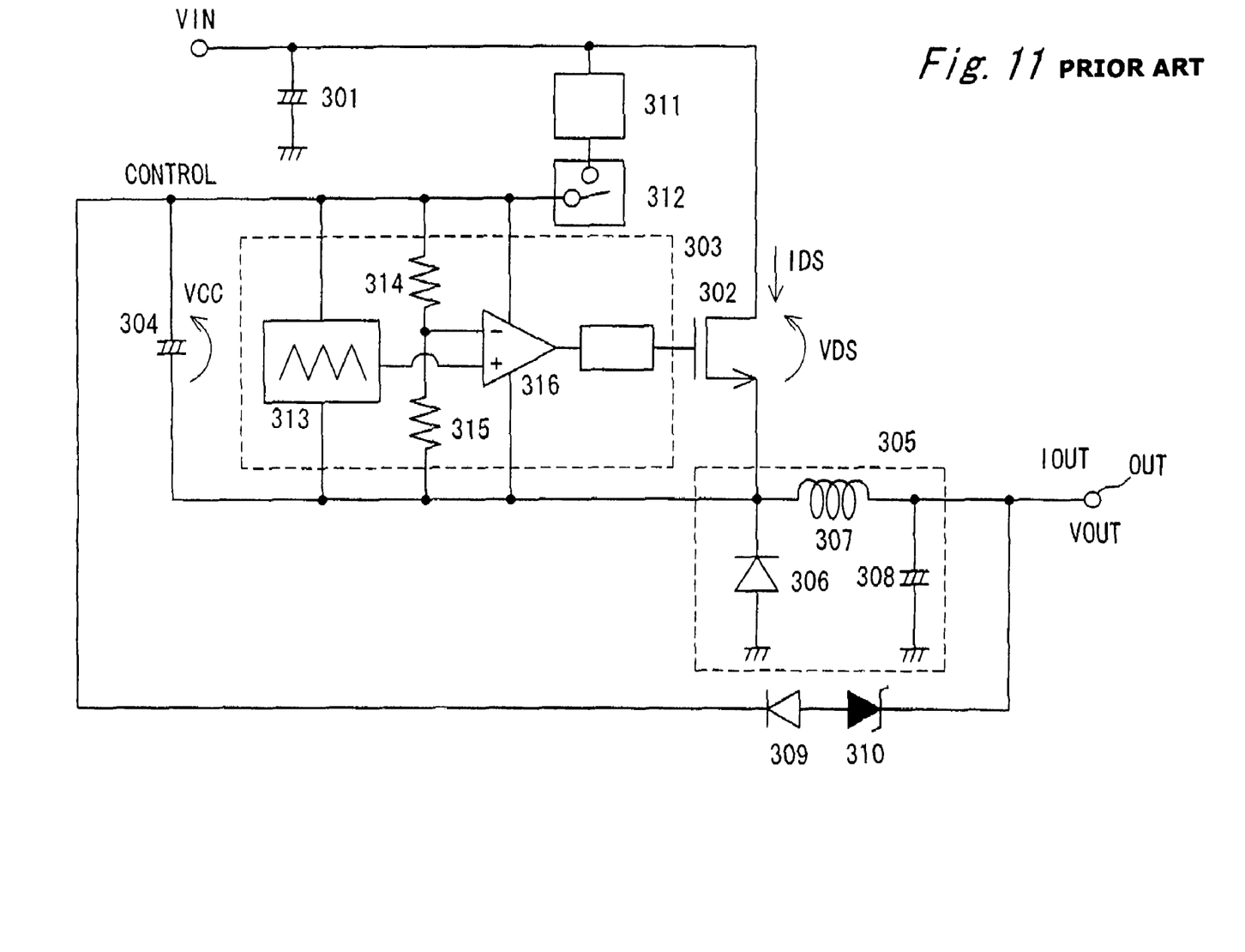
FIG. 11 is a block diagram of a switching power supply according to a third example of the prior art.

FIG. 9, FIG. 10, and FIG. 11 show examples of a step-down voltage type switching power supply. Step-down voltage switching power supplies include power supply devices with a bootstrap circuit to assure control power for the high side block as shown in FIG. 9 and FIG. 10, and power supply devices that do not have a bootstrap circuit and control the switching power using only the high side block as shown in FIG. 11.

FIG. 9 shows a first example of the prior art described in Japanese Unexamined Patent Appl. Pub. 2000-350440. Operation of the control circuit 108 in the first example of the prior art shown in FIG. 9 is referenced to the ground terminal 106, and derives control power for the high side switching device 107 when the switching device 107 is ON from both ends of the capacitor 110 in the bootstrap circuit 111, to which current is supplied from input power supply 101 through diode 109 when the high side switching device 107 is OFF.

FIG. 10 shows a second example of the prior art described in Japanese Unexamined Patent Appl. Pub. 2001-112241. The power supply device shown in FIG. 10 is a synchronous rectifier type power supply device having a bootstrap circuit similarly to the first prior art example shown in FIG. 9. The main difference between the device shown in FIG. 10 and the first example shown in FIG. 9 is that the diode 103 shown in FIG. 9 is replaced by a switching device 202. A level shifter 209 is also provided so that switching device 201 and switching device 202 are not on at the same time, and the switching devices are controlled so that when one is on the other is off. By using a switching device instead of a diode on the low side, the power supply efficiency is improved by lowering the voltage drop occurring at the ends of diode 103 in FIG. 9 when the high side switching device is off to the voltage drop caused by the on resistance of the switching device 202.

The simultaneous rectifier, step-down voltage type switching power supply shown in FIG. 10 has the following two main features.

(1) Generally when current flow to the high side switching device 107 rises in the prior art example shown in FIG. 9, current flow to the diode 103 also rises when the high-side switching device 107 is off, the forward voltage therefore also rises, and power loss from the diode 103 also rises. Power loss is therefore reduced by connecting a low on-resistance switching device parallel to the diode 103 (or a switching device 202 is used instead of the diode as shown in FIG. 10) so that the voltage produced when the circuit is energized is lower than the forward voltage of the diode 103.

(2) The switching devices connected to the high and low sides are switched on and off by PWM control so that both switching devices are not on at the same time.

FIG. 11 shows a third example of the prior art as taught in Japanese Unexamined Patent Appl. Pub. H10-191625. In FIG. 11 VOUT is the output node voltage, IOUT is the output node current, VDS is the voltage between the drain and source of switching device 302, IDS is the drain current flowing to the switching device 302, and VCC is the voltage at the CONTROL node in FIG. 11. The device described in FIG. 11 comprises an input capacitor 301, switching device 302, a control circuit 303 for the switching device 302, a capacitor 304 for the control circuit reference voltage, a conversion circuit 305, output voltage detection circuit 309, and protection device 310.

When the input terminal voltage VIN (a DC voltage or the voltage from a commercial AC power source rectified by a diode bridge or other rectifier and smoothed by input capacitor 301) is applied to the drain of switching device 302, the internal circuit current supply circuit 311 of the control circuit 303 supplies current through switch 312 to the capacitor 304 connected to the control node, VCC thus rises, and the control circuit 303 starts on/off control of the switching device 302. On/off switching of the switching device 302 is controlled by the comparator 316 comparing the sawtooth wave output signal from the internal oscillator 313 with the voltage-divided VCC output by the two resistances 314 and 315.

Once on/off control of the switching device 302 begins, power is supplied to the conversion circuit 305 comprising diode 306, coil 307, and output capacitor 308, and VOUT rises. VOUT is detected by output voltage detection circuit 309. When VOUT rises to or above a predetermined level, current flows from the OUT node to the CONTROL node of the control circuit 303 when switching device 302 is OFF. As a result, as a result of VCC rising and the ON duty of the output signal from comparator 316 decreasing, the ON duty of the switching device 302 is also short, and the switching device 302 is controlled with PWM control.

PWM control thus seeks to stabilize the output voltage and conserve energy by gradually reducing the ON duty ratio (ultimately lowering the peak of current IDS flow to the switching device) of the switching device as the output load decreases.

Figure 12:
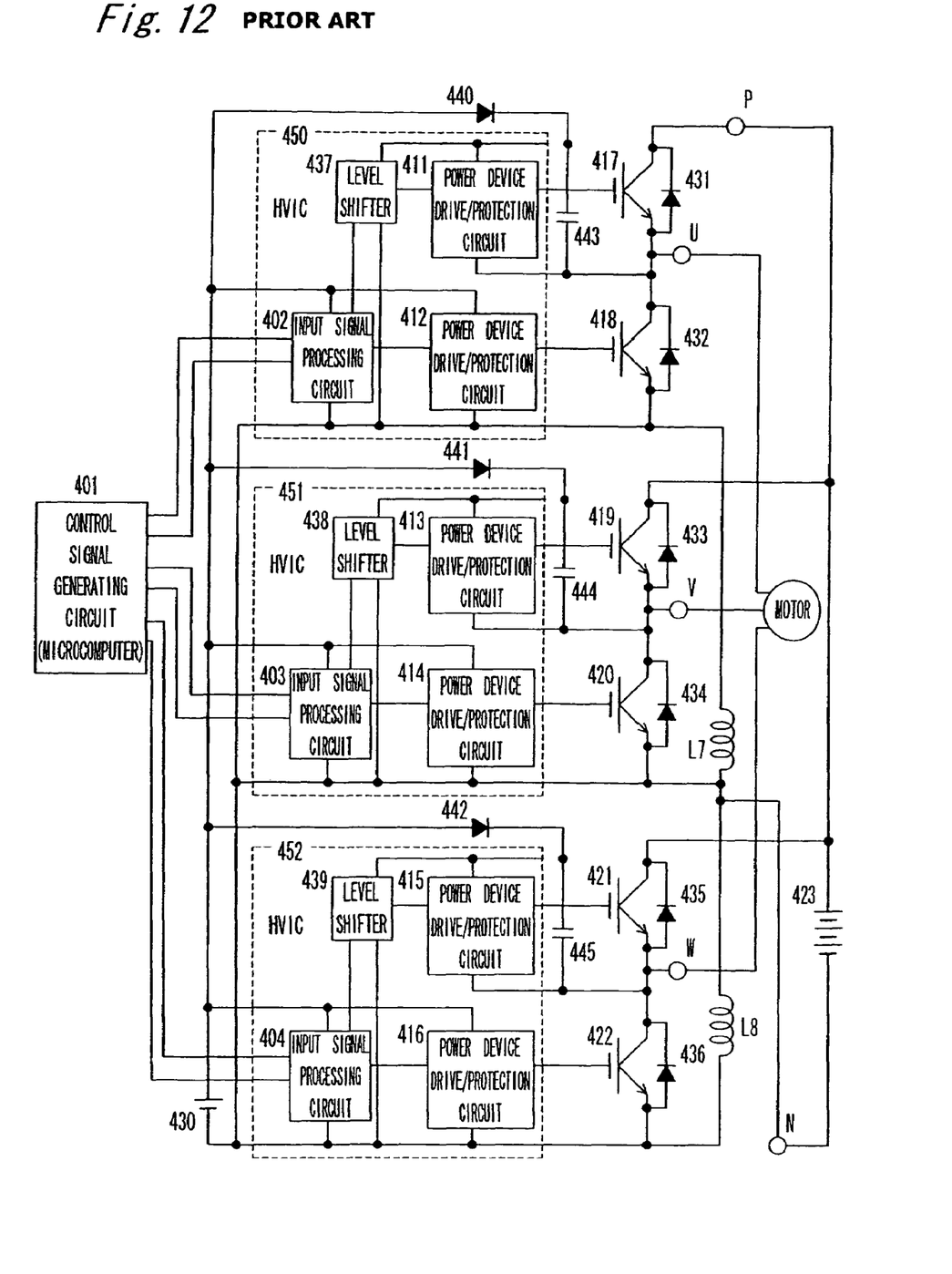
FIG. 12 is a block diagram of a three-phase motor drive circuit according to a fourth example of the prior art.

FIG. 12 shows a fourth example of the prior art as taught in Japanese Unexamined Patent Appl. Pub. 2003-189632 corresponding to United States Patent Appl. Pub. US 2003/0112040 A1. More particularly, FIG. 12 shows a bridge circuit using HVIC (high voltage driver IC) circuits 450, 451, and 452 for inverter control of a motor, and more particularly shows a three-phase motor drive circuit having three half-bridge circuits parallel connected with the output terminals connected to a motor. Power switching devices 417, 418, 419, 420, 421, 422 in a three-phase (U, V, W) bridge circuit are connected between the high and low potential sides of a main DC power source for inverter drive 423, and diodes 431, 432, 433, 434, 435, 436 are parallel connected to the power switching devices.

HVIC circuit 450 is a single-chip circuit device comprising input signal processing circuit 402, power device drive/protection circuit 412, and a level shifter 437 having a photocoupler and electrical isolation function. A similarly arranged single-chip HVIC circuit 450, 451, 452 is rendered separately for each phase, U, V, and W, but devices having a separate HVIC circuit for phases U, V, and W rendered on a single chip are also known.

The reference potential nodes of the three HVIC circuits and the emitter of each low potential power switching device are connected to the U, V, W phases. The emitters of the high potential side power switching devices and the second reference potential nodes of the high potential side drive circuits connected to the level shifters of the HVIC circuits are respectively connected to the U, V, W phases. The output drive signal nodes of the HVIC circuits are connected to the gate of each power switching device.

The input signal processing circuit of the HVIC circuit is connected to the output port of the microcomputer or other device that generates the control signals for driving the power switching devices, and power for controlling and driving the HVIC circuits is supplied from external power source 430. The power for driving the high potential power switching devices of the HVIC circuit is supplied from a bootstrap power circuit comprising external power source 430, high voltage diodes 440, 441, 442 and capacitors 443, 444, 445 connected in series to the external power source 430 for each U, V, W phase, and the ends of the capacitors 443, 444, 445 connected to both sides of the drive circuits for the high potential power switching devices.

When inverter drive is used with an actual motor, control signals are passed to the U, V, W phase HVIC circuits from the inverter drive control signal generating circuit of the microcomputer, and the power switching devices on the high and low potential sides of the U, V, W phase bridge circuit are switched according to the drive signal to supply AC power between the output nodes and control the motor.

A bootstrap power supply circuit drives the high side power switching circuits in this bridge drive circuit. This bootstrap power supply circuit operates so that when the main DC power source is applied to the bridge circuit, the microcomputer drive signal that drives the low-side power switching device is passed to the HVIC circuit, and the low-side power switching device turns on. Because current flows in this state from the external power source to the high voltage diode, to the capacitor, to the low-potential power switching device, and to the reference node of the external power source, both sides of the capacitor are charged by voltage Vcap as defined in equation (1).

$$Vcap = V(\text{external power source voltage}) - Vf - Vc(V) \quad (1)$$

where Vf is the forward voltage drop of the high voltage diode, and Vc is the collector potential of the low potential power switching device.

Operation of the drive circuit that drives the high side power switching devices of the HVIC circuit is maintained by the power accumulated in the capacitor. Therefore, when the main DC power source is applied to the inverter drive circuit, a charge is not accumulated in the capacitors 443, 444, 445, and the high-potential side drive circuit is therefore unable to operate.

After the main DC power source is applied, a drive signal causing the low-potential power switching device for each phase to stay on for a predetermined time is passed from the microcomputer to the HVIC circuit in order to charge capacitors 443, 444, 445. The motor is then controlled by passing the motor drive control signal from the microcomputer to each HVIC circuit.

If the voltage at both sides of the capacitors 443, 444, 445 is not regularly recharged, the charge stored in the capacitors will drop below the level required to the drive the power switching devices after a certain amount of time due to natural dissipation of the stored charge. A signal causing the low-potential power switching devices to turn on is applied to the HVIC circuits within a maximum time determined by the constant of the inverter drive circuit during motor drive, thereby controlling motor operation with a control signal that causes the capacitors 443, 444, 445 to charge.

The following three problems are present with the simultaneous rectifier method shown in FIG. 10.

(1) The input supply voltage is typically approximately 20 V. This is because signal transmission is required between the high side switching device control circuit unit and the low side switching device control circuit unit in order to achieve PWM control.

(2) If the input supply voltage is greater than 20 V, a bootstrap circuit (bootstrap circuit 111 in FIG. 9 and bootstrap circuit 203 in FIG. 10) for supplying power to the high side switching device control circuit, and a level shifting circuit (level shifter 209 in FIG. 10) for signal transmission are needed. Supplying power to the high-side switching device control circuit unit through the bootstrap circuit and signal transmission by the level shifting circuit from the low side to the high side are limited to periods when the high side switching device is off (that is, when the low-side switching device is on). As a result, on-time control of the high-side switching device is extremely difficult when the high-side switching device is on because the supply voltage of the high-side switching device control circuit discharges naturally and gradually drops. More specifically, this renders operation of the high-side switching device control circuit unstable. This is also the case with (3) described next.

(3) When used with an even high input supply voltage of 60 V or more, for example, the bootstrap circuit for supplying power to the high-side switching device control circuit comprises a diode 440 and capacitor 443, and is connected to a power source 430 that is separate from the main power source 423 connected to the high potential node of the high-side switching device 417. Two or more input power sources are thus required as shown in the inverter drive bridge circuit for a motor in the fourth example of the prior art shown in FIG. 12.

Reducing the size and improving the power supply efficiency of the switching power supply device, and further reducing the power consumption during standby states, and particularly in a no-load state, therefore cannot be expected using a step-down voltage switching power supply according to the prior art.

(1) The peak level of current flowing to the switching device drops in the no-load state with PWM control of the step-down voltage switching power supply taught in the third example of the prior art above, but further reduction in power consumption is difficult because the number of switching operations is constant irrespective of the load.

(2) The bootstrap circuit must be externally attached to the voltage step-down switching power supply described in the first and second examples of the prior art, and this prevents reducing the size of the power supply device.

(3) With the voltage step-down power supply device described in the first and second examples of the prior art, the high-side switching devices are switched on/off by the voltage at both ends of the capacitors in the bootstrap circuit, and a loss of control precision caused by the drop in capacitor voltage and fluctuation in the drain current caused by the fluctuating gate voltage of the switching device both occur easily.

(4) The input voltage range of the voltage step-down power supply device described in the first and second examples of the prior art is limited because use only at a relatively low voltage is difficult.

(5) The low potential side of the voltage step-down power supply device described in the third example of the prior art is composed of diodes as described in the first prior art example. This increases power loss in the diodes during steady state operation, and thus prevents further improvement in power efficiency.

(6) Separate power supplies are required for the control circuit and switching devices when using a high voltage input supply as described in the fourth prior art example.

SUMMARY OF THE INVENTION

The present invention is directed to solving these problems, and an object of the invention is to further increase efficiency and reduce power consumption and device size in a switching power supply.

To achieve this object, a switching power supply device according to the present invention comprises a first source voltage supply arrangement for supplying a first supply voltage; a PWM signal generator operable to generate a PWM signal; a first switching arrangement operable to switch the first supply voltage based on the PWM signal; a converter operable to convert the switched first supply voltage to a second supply voltage; a difference signal detector operable to output the difference between the second supply voltage and a predetermined reference voltage as a difference signal; and an intermittent controller operable to stop the switching operation of the first switching arrangement when the difference signal is less than or equal to a first threshold value. The PWM signal generator varies the pulse width based on the difference signal and generates the PWM signal.

A switching power supply device according to another aspect of the invention comprises a first source voltage supply arrangement operable to supply a first supply voltage; a PWM signal generator operable to generate a PWM signal; a first switching arrangement operable to switch the first supply voltage based on the PWM signal; a converter operable to convert the switched first supply voltage to a second supply voltage; a difference signal detector operable to output the difference between the second supply voltage and a predetermined reference voltage as a difference signal; a current converter operable to convert the difference signal to current; a voltage converter operable to convert the current-converted difference signal to voltage; a first regulator operable to convert the first supply voltage to a predetermined third supply voltage, and to supply the third supply voltage to the PWM signal generator and voltage converter; and a second regulator operable to convert the second supply voltage to a predetermined fourth supply voltage, and to supply the fourth supply voltage to the difference signal detector and current converter. The PWM signal generator generates the PWM signal based on the voltage-converted difference signal.

A switching power supply device according to the present invention can reduce power consumption in the standby state, and particularly in a no-load state, over a wide input voltage range, and can thus provide a high efficiency power supply in steady-state operation.

Furthermore, because a bootstrap circuit is not needed and the gate drive voltage precision of the first switching device is improved, power supply to the output node from the first switching device can be stabilized.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Preferred embodiments of the present invention are described below with reference to the accompanying figures.

Embodiment 1

Figure 1:
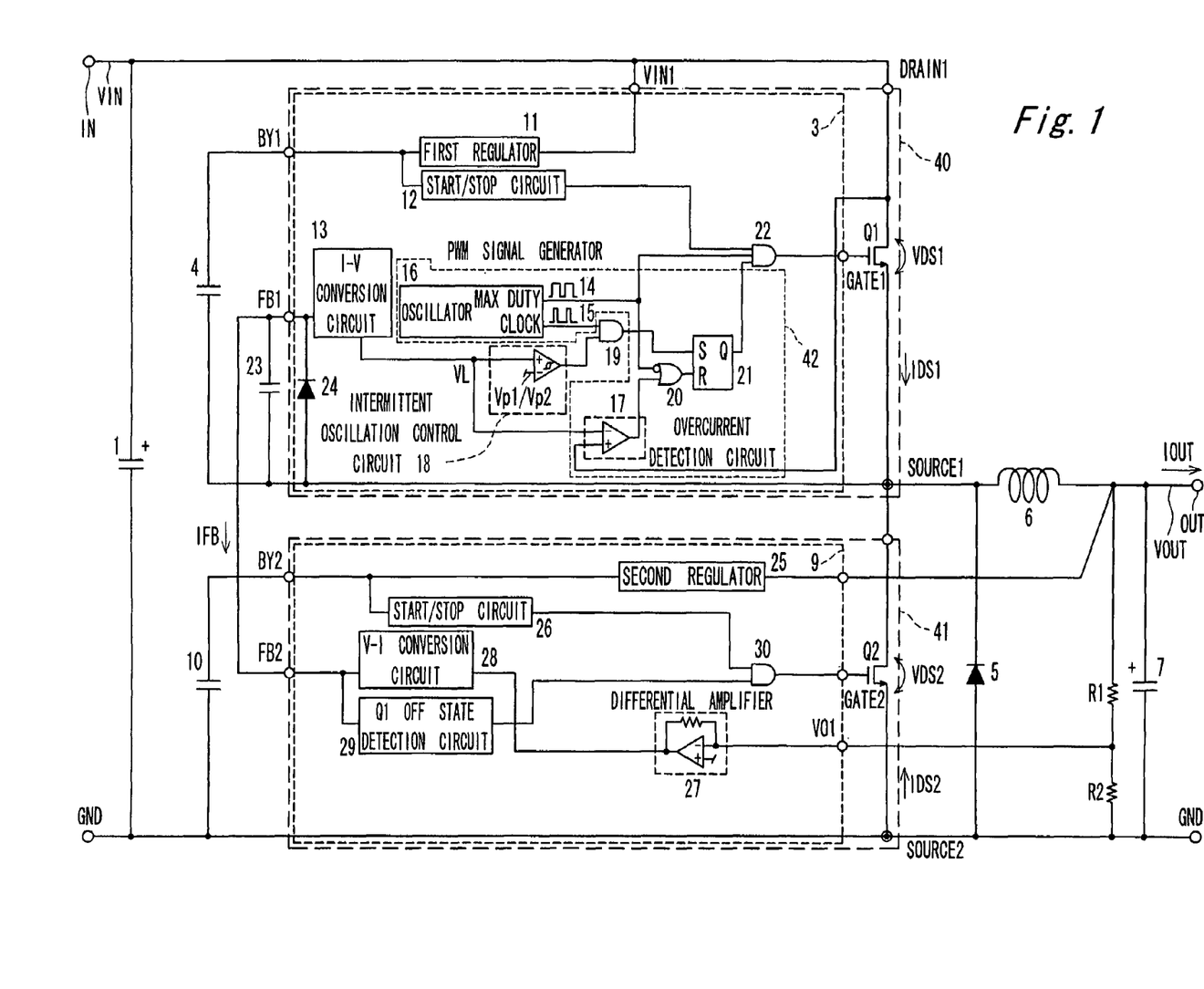
FIG. 1 is a block diagram of a switching power supply according to a first embodiment of the invention.
Figure 2:
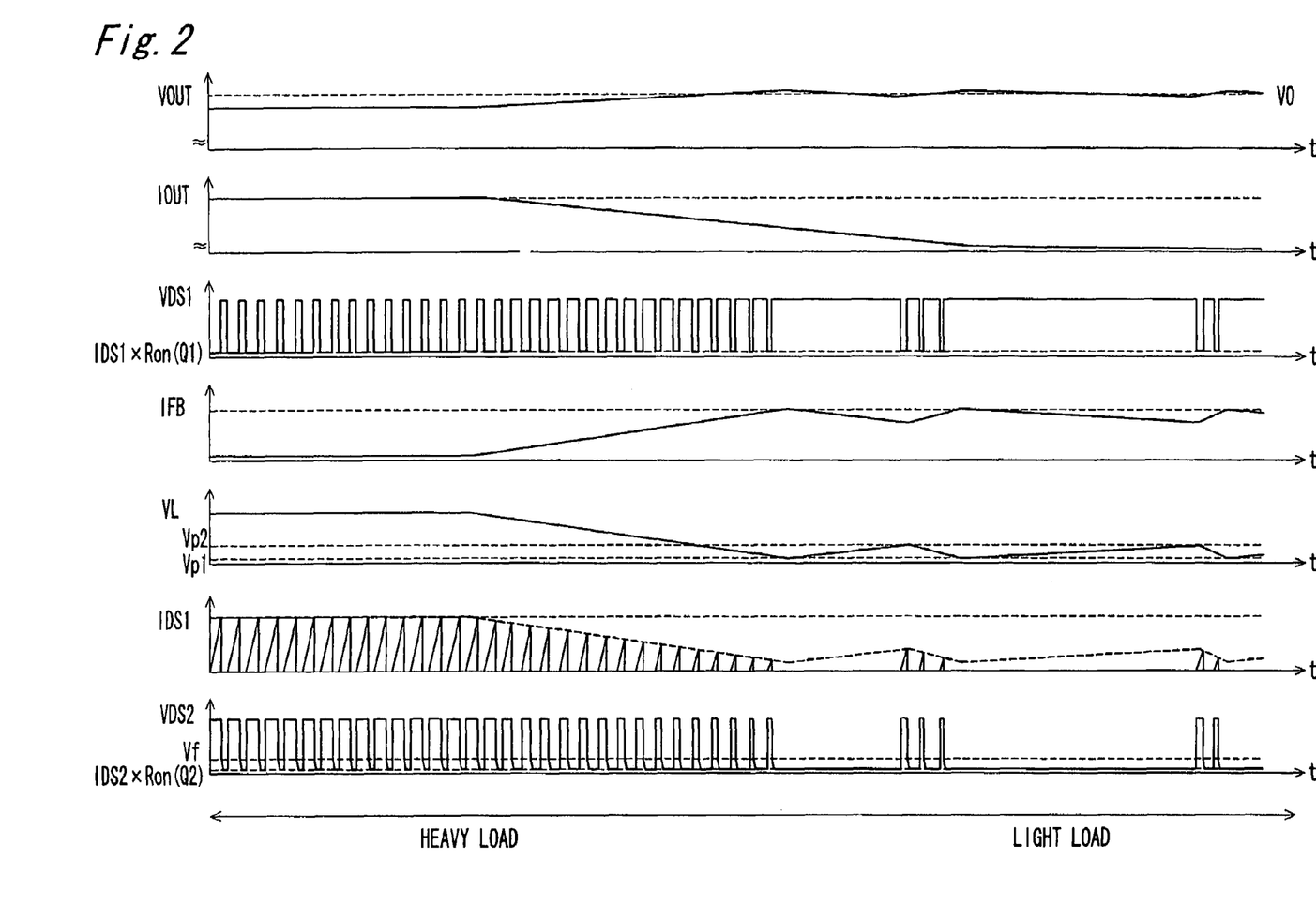
FIG. 2 describes the operation of a switching power supply according to the first embodiment of the invention.

FIG. 1 shows a switching power supply device according to a first embodiment of the invention, and FIG. 2 shows the operating waves when the output load of the switching power supply in this first embodiment of the invention changes from a heavy load to a light load. In FIG. 1 and FIG. 2 the first supply voltage VIN is the voltage input to the input terminal IN from the first power supply voltage supply device where the ground potential of the ground terminal GND is the lowest potential; the second supply voltage VOUT is the voltage output from output terminal OUT where the lowest potential is the ground potential; IOUT is the current level at output terminal OUT; VDS1 is the DRAIN1 voltage of switching device Q1; IFB is the FB1 node current (=FB2 node current); IDS1 is the DRAIN1 current flowing through switching device Q1.

The switching power supply device according to this first embodiment of the invention comprises input capacitor 1, switching device Q1 and switching device Q1 control circuit 3, first capacitor for the control circuit reference voltage 4, a conversion circuit comprising third diode 5, coil 6, and output capacitor 7, switching device Q2 and a control circuit 9 for on/off control detecting the output voltage of the switching device Q2, a second reference voltage capacitor 10 for the control circuit 9, and two resistances R1 and R2. The switching device Q1 is a MOS transistor or high voltage transistor.

As shown in FIG. 1, the control circuit 3 has a first regulator 11 that is connected to node VIN1 and produces and maintains a constant third supply voltage at node BY1 for supplying power to the other elements of the control circuit 3; a start/stop circuit 12 for starting the control circuit 3 when the third supply voltage equals or exceeds a predetermined level, and stopping the control circuit 3 when the third supply voltage is less than the predetermined level; a I-V conversion circuit 13 which takes the third supply voltage supplied from node BY1 and outputs the current flowing out from the control circuit 3 from node FB1 as output voltage signal VL; an oscillator 16 that outputs the MAX-DUTY signal 14 controlling the maximum on-duty ratio of the switching device Q1 and CLOCK signal 15, which is an internal reference signal; an overcurrent detection circuit 17 for detecting the DRAIN1 current flowing to the switching device Q1 using the output voltage signal VL from the I-V conversion circuit as the reference voltage, and turning the switching device Q1 off; an intermittent oscillation control circuit 18 for pausing or stopping on/off control of the switching device Q1 when the output voltage signal VL from the I-V conversion circuit becomes less than first threshold level Vp1 (at which time the threshold level of the inverted input terminal changes from first threshold level Vp1 to second threshold level Vp2), and resuming on/off control of the switching device Q1 when the output voltage signal VL from the I-V conversion circuit rises above second threshold level Vp2; an AND circuit 19 for outputting to the set node of flip-flop 21 based on the output from the intermittent oscillation control circuit 18 and the CLOCK signal 15 from oscillator 16; an OR circuit 20 for outputting tot he reset node of the flip-flop 21 based on the inverted MAX-DUTY signal 14 from the oscillator 16 and the output signal from the overcurrent detection circuit 17; a flip-flop 21; and an AND circuit 22 for controlling the GATE1 node of switching device Q1 based on the output signal from start/stop circuit 12, the MAX-DUTY signal 14 from oscillator 16, and the output signal from the flip-flop 21. A capacitor 23 and second diode 24 are connected between node FB1 of I-V conversion circuit 13 and SOURCE1.

The control circuit 9, which provides on/off control and detects the output voltage of the switching device Q2, comprises a second regulator 25 that generates and maintains a constant fourth supply voltage at node BY2 for supplying power to the other elements of the control circuit 9 from second supply voltage VOUT; a start/stop circuit 26 for starting control circuit 9 when the node BY2 voltage is greater than or equal to a predetermined level, and stops the control circuit 9 when the node BY2 voltage is less than the predetermined level; a differential amplifier 27 which takes as inputs the fourth supply voltage supplied from node BY2 as the power supply voltage and the voltage of second supply voltage VOUT divided by the two resistances R1 and R2, and amplifies and outputs as a difference signal the potential difference between the voltage-divided VOUT and a reference voltage input to the non-inverted input node; a V-I conversion circuit 28 having the fourth supply voltage supplied from node BY2 as the power supply voltage for converting the difference signal to current IFB at node FB2; a Q1 OFF state detection circuit 29 for detecting if switching device Q1 is off from the voltage at node FB2; and an AND circuit 30 for controlling the GATE2 node of switching device Q2 based on the outputs from Q1 OFF state detection circuit 29 when the output signal from start/stop circuit 26 is HIGH.

When first supply voltage VIN (a DC voltage or voltage from a commercial AC power supply rectified by a diode bridge or other rectifier and then smoothed by input capacitor 1) is applied to input terminal IN, the first regulator 11 of control circuit 3 supplies current to the first capacitor 4 for the control circuit reference voltage connected to node BY1. This causes the voltage at node BY1 to rise, the start/stop circuit 12 to start control circuit 3 operation, and on/off control of the switching device Q1 to start. When on/off control of the switching device Q1 starts, power is supplied to the conversion circuit comprising third diode 5, coil 6, and output capacitor 7, and the second supply voltage VOUT rises at output terminal OUT.

When second supply voltage VOUT rises, the second regulator 25 operates and the voltage at reference voltage node BY2 of control circuit 9 rises. When the voltage at reference voltage node BY2 is greater than or equal to the predetermined level used by the start/stop circuit 26, control circuit 9 starts operating and starts detecting the voltage at the output terminal OUT of differential amplifier 27. The second supply voltage VOUT is detected by the two resistances R1 and R2 and differential amplifier 27. When second supply voltage VOUT is greater than or equal to a desired voltage (more precisely, when the VO1 node voltage is greater than or equal to the predetermined reference voltage input to the non-inverted input terminal of the differential amplifier 27) the difference between the voltage at VO1 and the reference voltage of the differential amplifier 27 is amplified and passed as the difference signal to V-I conversion circuit 28.

When second supply voltage VOUT is greater than or equal to the desired voltage and second supply voltage VOUT rises, the difference signal decreases linearly and is converted by the V-I conversion circuit 28 so that the current level at node FB2 rises and the output voltage signal VL from I-V conversion circuit 13 drops.

VL is the reference voltage of the overcurrent detection circuit 17. When VL decreases, the peak current at DRAIN1 flowing to the switching device Q1 decreases. As a result, as shown in FIG. 2, current IDS1 at node DRAIN1 is PWM controlled in a current mode, and the DRAIN1 node voltage VDS1 is switched by PWM control. The oscillator 16, overcurrent detection circuit 17, OR circuit 20, and flip-flop 21 thus constitute a PWM signal generator 42, the gate voltage at the GATE1 node of switching device Q1 is controlled based on the PWM signal generated by the PWM signal generator 42, and PWM switching of switching device Q1 is achieved. The third supply voltage is supplied to PWM signal generator 42 from node BY1 as the supply voltage.

When the second supply voltage VOUT rises to or above a desired voltage (a low output load state) and the output voltage signal VL of I-V conversion circuit 13 is less than or equal to first threshold level Vp1 of the intermittent oscillation control circuit 18, the output load state is determined to be a low load state, and the intermittent oscillation control circuit 18 pauses or stops switching device Q1 operation. Stopping on/off control of the switching device Q1 stops power supply to the output, and second supply voltage VOUT gradually decreases. As second supply voltage VOUT drops, output voltage signal VL gradually rises. When output voltage signal VL becomes equal to or greater than second threshold level Vp2 of intermittent oscillation control circuit 18, on/off control of the switching device Q1 resumes and power is supplied to the output. As a result, second supply voltage VOUT rises again and on/off control of switching device Q1 stops. This intermittent control thus continues in a low output load state.

Note that second threshold level Vp2 is normally set higher than first threshold level Vp1.

During PWM control and intermittent control of the switching device Q1 by control circuit 3, the Q1 OFF state detection circuit 29 monitors the node FB2 voltage to detect the OFF state of the switching device Q1 so that the switching device Q2 is controlled by the AND circuit 30 to be ON only when switching device Q1 is OFF. The voltage between DRAIN2 [NOT LABELLED IN THE FIGURE] and SOURCE2 when switching device Q1 is ON (=IDS2*Ron (Q2) denoted by VDS2 in FIG. 2) is set lower than the forward voltage Vf of the third diode 5. Third diode 5 is connected parallel to the switching device Q2 to improve the turn-on time of switching device Q2.

When a switching power supply device according to this first embodiment of the invention is used, the following effects are achieved over a wide input range.

(1) As the output load decreases, the peak of the current flow to the switching device Q1 decreases and is PWM controlled in a low load state, and when the output load then approaches a no-load state, intermittent control is applied, thereby achieving even greater power conservation in the standby state.

(2) Because switching device Q2 goes ON when switching device Q1 is OF, the forward voltage of the third diode 5 can be further reduced, and a high efficiency power supply can be achieved in steady-state operation.

(3) A low-side V-I conversion circuit 28 and a high-side I-V conversion circuit 13 are disposed to use a new signal transmission method using current signals for signal transmission between the high-side control circuit 3 and the low-side control circuit 9. A level shifting circuit is therefore not needed even when using a high voltage power supply, and circuit design is thus simplified.

(4) Because a bootstrap circuit and a level shifting circuit that are necessary when a high input supply voltage is used are not needed, a simultaneous rectifier switching power supply device can be provided using a single input supply voltage regardless of the range of the input power supply voltage.

(5) The supply voltage of the high-side control circuit 3 and the supply voltage of the low-side control circuit 9 are maintained at constant level by the first regulator 11 and second regulator 25, respectively, and the supply voltage does not drop as a result of natural voltage discharge. This simplifies ON time control of the high-side switching device Q1.

Switching device Q1 and control circuit 3 are preferably integrated on the same semiconductor substrate, in which case the DRAIN1, SOURCE1, BY1, and FB1 nodes are rendered as external connection pins. By incorporating these devices in a package with at least four pins, the parts count can be greatly reduced, part dimensions can be reduced, and a small, low price power supply device can be rendered.

Switching device Q2 and control circuit 9 are also preferably integrated on the same semiconductor substrate, in which case the DRAIN2, SOURCE2, BY2, and FB2 nodes are rendered as external connection pins. By incorporating these devices in a package with at least four pins, the parts count can be greatly reduced, part dimensions can be reduced, and a small, low price power supply device can be rendered.

Furthermore, by integrating switching device Q1 and control circuit 3 on the same semiconductor substrate, integrating switching device Q2 and control circuit 9 on the same semiconductor substrate, and assembling both semiconductor substrates in a single package with at least 7 pins, the parts count can be greatly reduced, part dimensions can be reduced, and a small, low price power supply device can be rendered.

Furthermore, by integrating switching device Q1 and control circuit 3 on the same semiconductor substrate, integrating switching device Q2 and control circuit 9 on the same semiconductor substrate, and assembling both semiconductor substrates with the first capacitor 4 for the reference voltage of the control circuit 3, second capacitor 10 for the reference voltage of the control circuit 9, capacitor 23, third diode 5, output capacitor 7, and resistances R1 and R2 in a single package with at least the four pins DRAIN1, SOURCE1, SOURCE2, and OUT, the parts count can be greatly reduced, part dimensions can be reduced, and a small, low price power supply device can be rendered.

Note, further, that switching device Q1 is also referred to as a first switching device, switching device Q2 as a second switching device, intermittent oscillation control circuit 18 an intermittent controller, differential amplifier 27 as a difference signal detector, I-V conversion circuit 13 as a voltage converter, V-I conversion circuit 28 as a current converter, and Q1 OFF state detection circuit 29 as an inversion signal generator. The circuit including the overcurrent detection circuit 17 is also called an overcurrent protection circuit.

Second Embodiment

Figure 3:
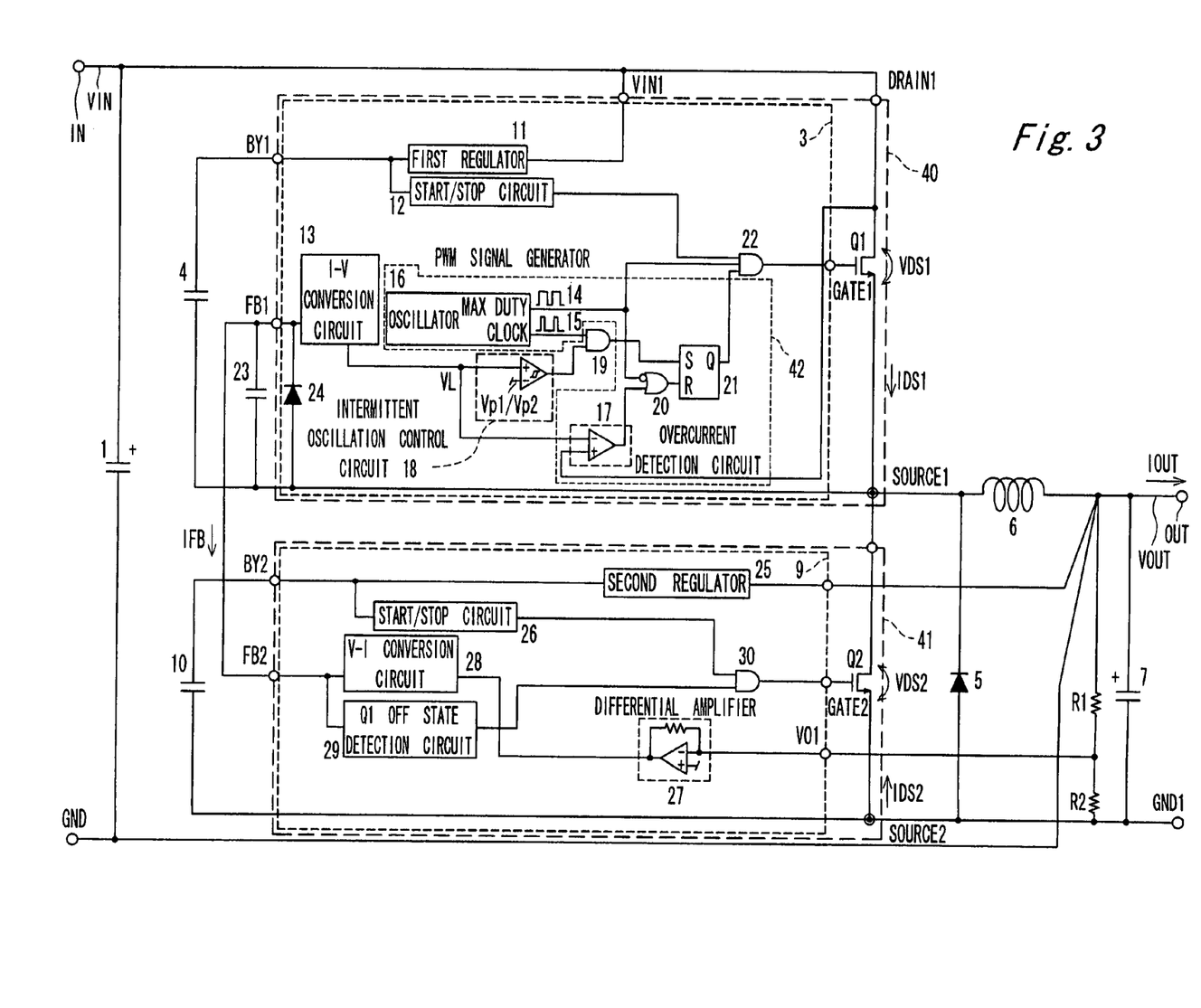
FIG. 3 is a block diagram of a switching power supply according to a second embodiment of the invention.

FIG. 3 shows a switching power supply device according to a second embodiment of the invention. This embodiment of the invention renders a negative output power supply by connecting the negative terminal of the input capacitor 1 connected to the anode of the third diode 5 in FIG. 1 to the positive terminal of the output capacitor 7. As a result, the minimum potential of the second supply voltage VOUT is equal to the minimum potential of the first supply voltage VIN minus second supply voltage VOUT.

More specifically, the polarity of the second supply voltage is the same as the polarity of the first supply voltage in the first embodiment of the invention shown in FIG. 1, but in the second embodiment of the invention shown in FIG. 3 the polarity of the second supply voltage is the opposite of the polarity of the first supply voltage. The power supply operation is the same as in the switching power supply device of the first embodiment of the invention.

In addition to the effects afforded by the first embodiment of the invention, using a switching power supply device according to this second embodiment of the invention enables easily changing the polarity of the output voltage.

Third Embodiment

Figure 4:
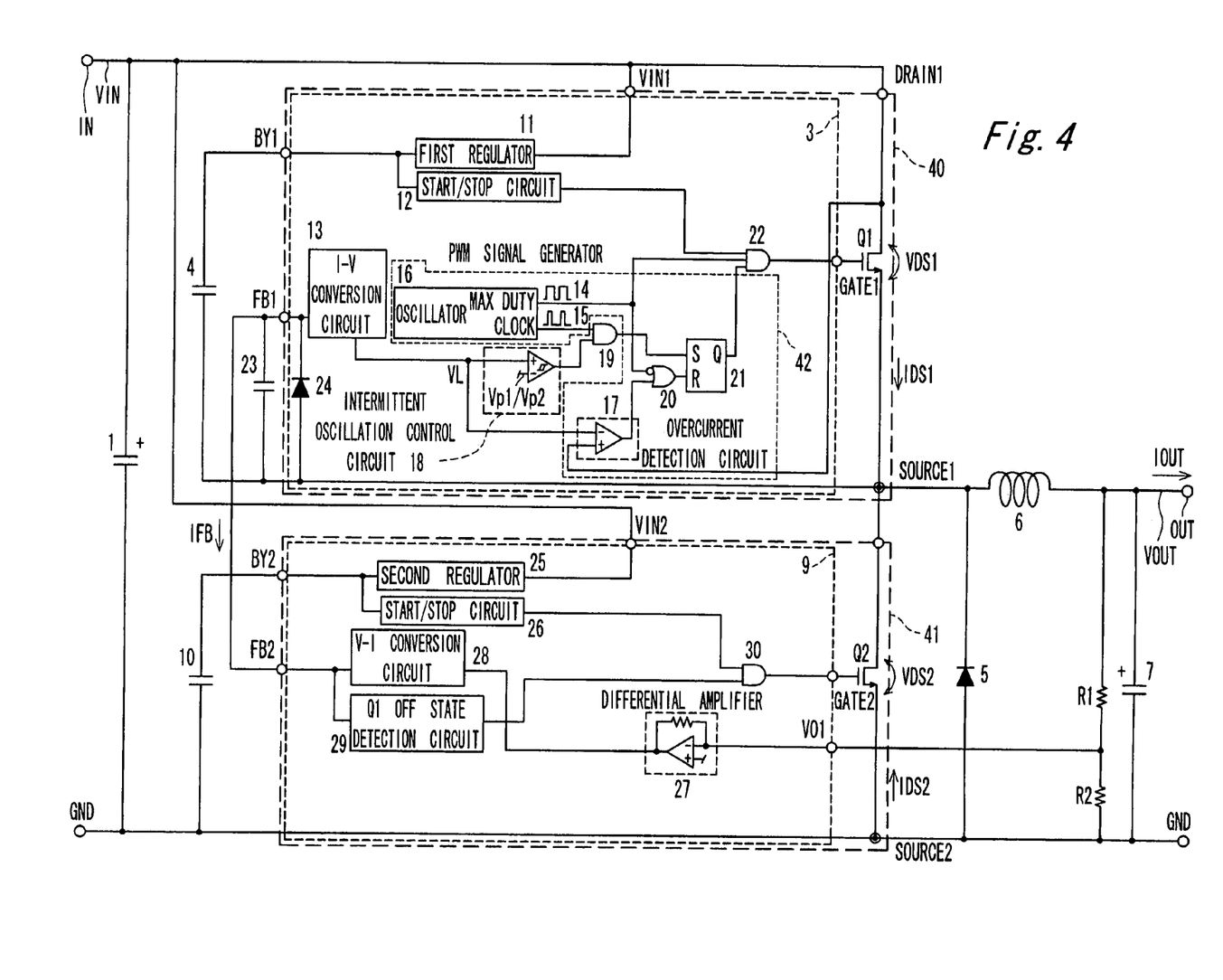
FIG. 4 is a block diagram of a switching power supply according to a third embodiment of the invention.

FIG. 4 shows a switching power supply device according to a third embodiment of the invention. In this embodiment of the invention power is supplied to the second regulator 25 of the control circuit 9 not from second supply voltage VOUT but instead directly from first supply voltage VIN. The power supply operation is the same as in the switching power supply device of the first embodiment of the invention.

In addition to the effects afforded by the first embodiment of the invention, using a switching power supply device according to this third embodiment of the invention enables easily lowering the output voltage.

Fourth Embodiment

Figure 5:
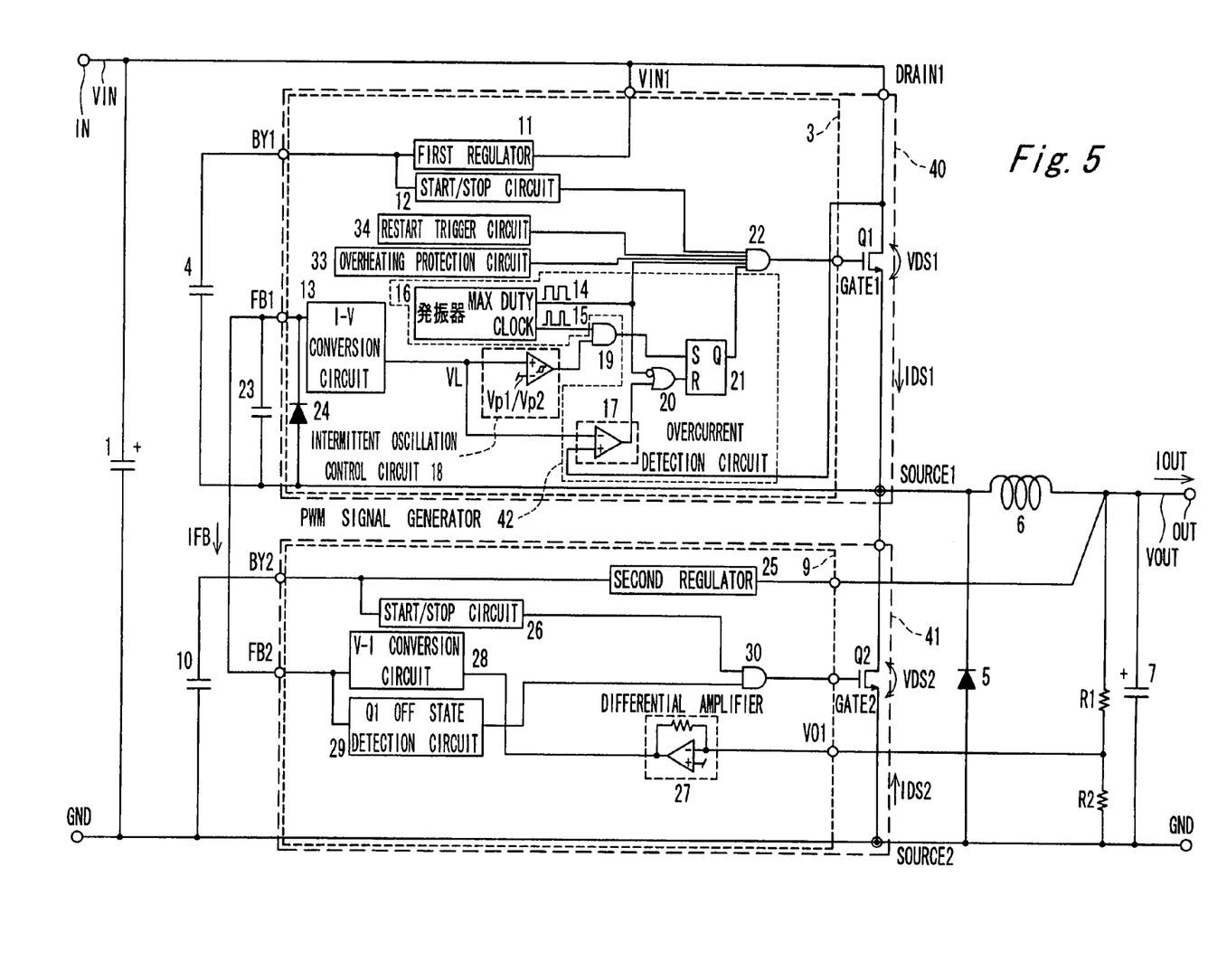
FIG. 5 is a block diagram of a switching power supply according to a fourth embodiment of the invention.

FIG. 5 shows a switching power supply device according to a fourth embodiment of the invention. This fourth embodiment of the invention adds an overheating protection circuit 33 to the control circuit 3 shown in FIG. 1, and additionally connects a restart trigger circuit 34 for canceling the interrupt imposed by the overheating protection circuit 33 to the input to AND circuit 22. The overheating protection circuit 33 renders a protection function that unconditionally stops on/off control of the switching device Q1 when the junction temperature of the switching device Q1 rises to or above a predetermined threshold temperature.

The power supply operation is the same as in the switching power supply device of the first embodiment of the invention.

In addition to the effects afforded by the first embodiment of the invention, using a switching power supply device according to this fourth embodiment of the invention enables protecting the switching device and assuring the safety of the switching power supply device.

Fifth Embodiment

Figure 6:
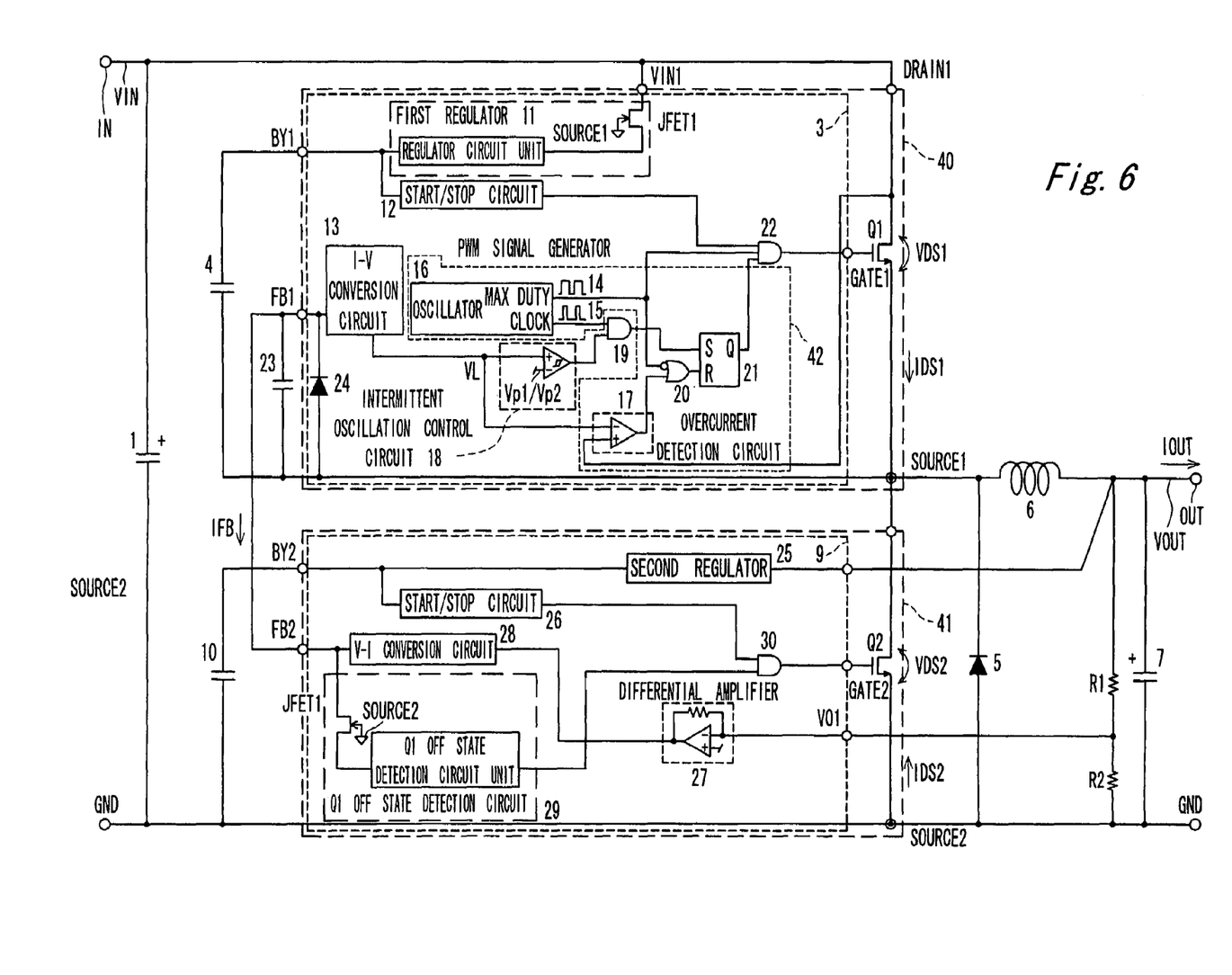
FIG. 6 is a block diagram of a switching power supply according to a fifth embodiment of the invention.

FIG. 6 shows a switching power supply device according to a fifth embodiment of the invention. This switching power supply device adds a junction field effect transistor JFET1 connected to node VIN1 in the first regulator 11 of the control circuit 3 shown in FIG. 1, and a junction field effect transistor JFET2 connected to node FB2 of the Q1 OFF state detection circuit 29 in the control circuit 9 shown in FIG. 1. The power supply operation is the same as in the switching power supply device of the first embodiment of the invention.

Using a switching power supply device according to this fifth embodiment of the invention affords the same effects as the first embodiment of the invention even when the input voltage is high.

Sixth Embodiment

Figure 7:
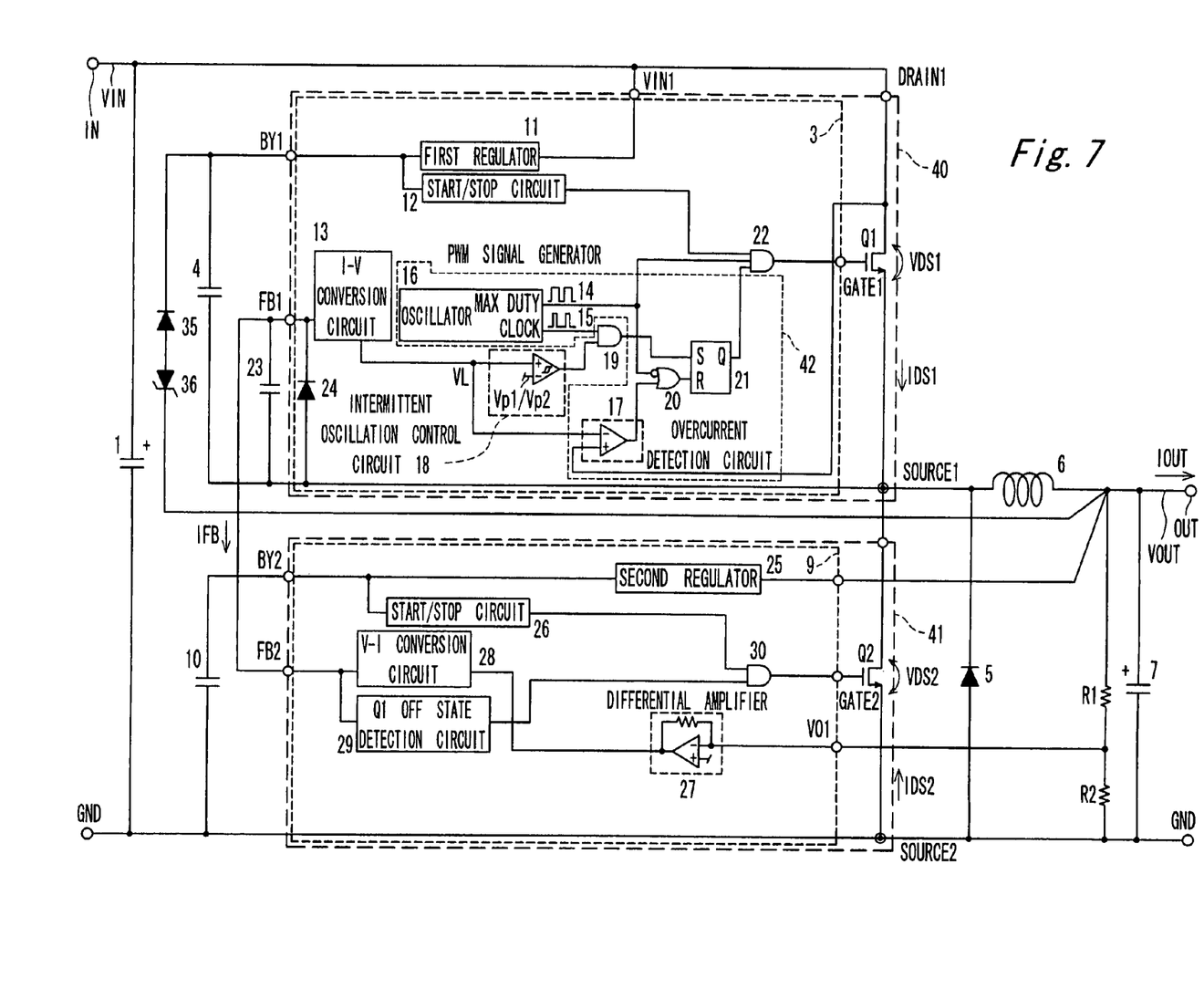
FIG. 7 is a block diagram of a switching power supply according to a sixth embodiment of the invention.

FIG. 7 shows a switching power supply device according to a sixth embodiment of the invention. As shown in FIG. 7, this embodiment of the invention adds a first diode 35 and a zener diode 36 between the reference voltage node BY1 and output terminal OUT of the control circuit 3 in the first embodiment. The power supply operation is the same as in the switching power supply device of the first embodiment of the invention.

When a switching power supply device according to this sixth embodiment of the invention is used the power supply to the reference voltage node BY1 of the control circuit 3 is from output terminal OUT instead of first regulator 11. As a result, the power conservation effect in the standby mode is even greater than with the first embodiment of the invention.

Seventh Embodiment

Figure 8:
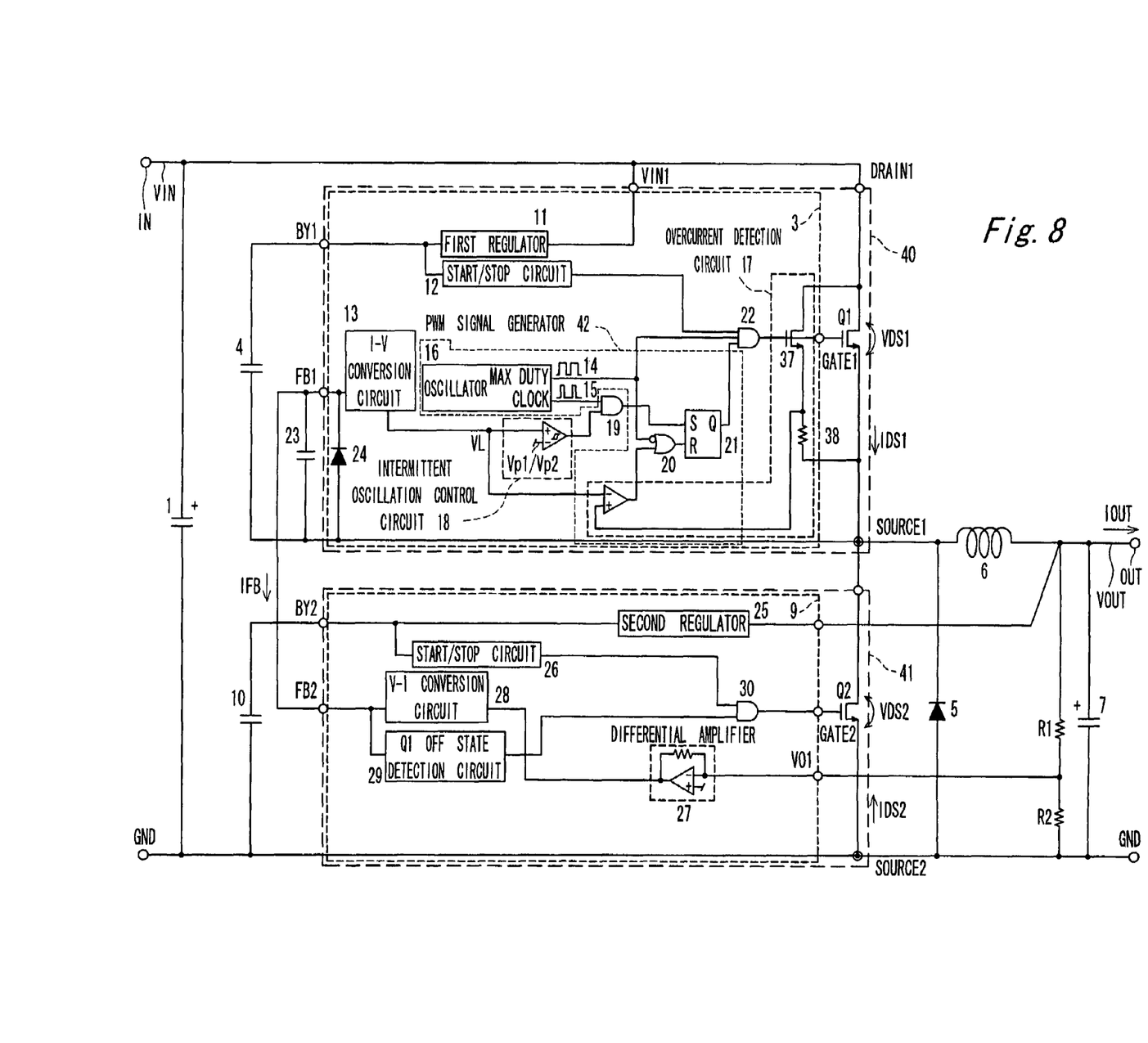
FIG. 8 is a block diagram of a switching power supply according to a seventh embodiment of the invention.

FIG. 8 shows a switching power supply device according to a seventh embodiment of the invention. The overcurrent detection circuit 17 shown in FIG. 1 is rendered by a sense MOS transistor 37, sense resistor 38, and comparator in this embodiment of the invention. The power supply operation is the same as in the switching power supply device of the first embodiment of the invention.

A switching power supply device according to this seventh embodiment of the invention affords the same effect as the first embodiment of the invention.

The present invention is described herein using a step-down type switching power supply device by way of example, but the invention is not limited to a step-down type power supply device and can be used with all types of switching power supply devices, including both step-down and step-up types. The embodiments herein are also described by way of example only, and the invention is not limited to these embodiments.

The present invention can be used in a switching power supply.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A switching power supply device comprising:
   a first source voltage supply arrangement operable to supply a first supply voltage;
   a PWM signal generator operable to generate a PWM signal;
   a first switching arrangement operable to switch the first supply voltage based on the PWM signal;
   a converter operable to convert the switched first supply voltage to a second supply voltage;
   a difference signal detector operable to output the difference between the second supply voltage and a predetermined reference voltage as a difference signal;
   an intermittent controller operable to stop the switching operation of the first switching arrangement when the difference signal is less than or equal to a first threshold value;
   a current converter operable to convert the difference signal to a current signal; and
   a voltage converter operable to convert the current-converted difference signal to a voltage signal;
   wherein the PWM signal generator varies the pulse width of the PWM signal based on the voltage-converted difference signal and generates the PWM signal.

2. The switching power supply device described in claim 1, further comprising:
   a first regulator operable to convert the first supply voltage to a predetermined third supply voltage, and to supply the third supply voltage to the PWM signal generator and voltage converter; and
   a second regulator operable to convert the second supply voltage to a predetermined fourth supply voltage, and to supply the fourth supply voltage to the difference signal detector and current converter.

3. The switching power supply device described in claim 2, further comprising:
   a first capacitor connected to the output node of the first regulator.

4. The switching power supply device described in claim 1, further comprising:
   an inversion signal generator operable to generate an inverted signal of the PWM signal; and
   a second switching arrangement connected to the first switching arrangement;
   wherein the second switching arrangement switches based on the inversion signal.

5. The switching power supply device described in claim 2, wherein the second regulator converts the first supply voltage to the fourth supply voltage.

6. The switching power supply device described in claim 1, wherein the intermittent controller restarts the switching operation when the difference signal goes to a second threshold value or above while the switching operation is stopped.

7. The switching power supply device described in claim 2, further comprising:
   a circuit having a first diode and a zener diode connected in series;
   wherein the series circuit converts the second supply voltage to the third supply voltage.

8. The switching power supply device described in claim 2, further comprising:
   a second diode connected to an input terminal of the voltage converter.

9. The switching power supply device described in claim 1, wherein the first switching arrangement is a high voltage transistor.

10. The switching power supply device described in claim 1, wherein the converter comprises a third diode, a coil, and an output capacitor.

11. The switching power supply device described in claim 1, further comprising an overcurrent protection circuit.

12. The switching power supply device described in claim 1, further comprising an overheating protection circuit.

13. The switching power supply device described in claim 1, wherein the converter outputs a second supply voltage of the same polarity as the first supply voltage.

14. The switching power supply device described in claim 1, wherein the converter outputs a second supply voltage of opposite polarity to the first supply voltage.

15. A switching power supply device comprising:
a first source voltage supply arrangement operable to supply a first supply voltage;
a PWM signal generator operable to generate a PWM signal;
a first switching arrangement operable to switch the first supply voltage based on the PWM signal;
a converter operable to convert the switched first supply voltage to a second supply voltage;
a difference signal detector operable to output the difference between the second supply voltage and a predetermined reference voltage as a difference signal;
a current converter operable to convert the difference signal to a current signal;
a voltage converter operable to convert the current signal to a voltage-converted difference signal;
a first regulator operable to convert the first supply voltage to a predetermined third supply voltage, and to supply the third supply voltage to the PWM signal generator and voltage converter; and
a second regulator operable to convert the second supply voltage to a predetermined fourth supply voltage, and to supply the fourth supply voltage to the difference signal detector and current converter;
wherein the PWM signal generator varies a pulse width of the PWM signal based on the voltage-converted difference signal and generates the PWM signal.

16. The switching power supply device described in claim 15, further comprising:
a first capacitor connected to the output node of the first regulator.

17. The switching power supply device described in claim 15, further comprising:
an inversion signal generator operable to generate an inverted signal of the PWM signal; and
a second switching arrangement connected to the first switching arrangement;
wherein the second switching arrangement switches based on the inversion signal.

18. The switching power supply device described in claim 15, wherein the second regulator converts the first supply voltage to the fourth supply voltage.

19. The switching power supply device described in claim 15, further comprising an intermittent controller operable to stop the switching operation of the first switching arrangement when the difference signal is less than or equal to a first threshold value.

20. The switching power supply device described in claim 19, wherein the intermittent controller restarts the switching operation when the difference signal goes to a second threshold value or above while the switching operation is stopped.

21. The switching power supply device described in claim 15, further comprising:
a circuit having a first diode and a zener diode connected in series;
wherein the series circuit converts the second supply voltage to the third supply voltage.

22. The switching power supply device described in claim 15, further comprising:
a second diode connected to an input terminal of the voltage converter.

23. The switching power supply device described in claim 15, wherein the first switching arrangement is a high voltage transistor.

24. The switching power supply device described in claim 15, wherein the converter comprises a third diode, a coil, and an output capacitor.

25. The switching power supply device described in claim 15, further comprising an overcurrent protection circuit.

26. The switching power supply device described in claim 15, further comprising an overheating protection circuit.

27. The switching power supply device described in claim 15, wherein the converter outputs a second supply voltage of the same polarity as the first supply voltage.

28. The switching power supply device described in claim 15, wherein the converter outputs a second supply voltage of opposite polarity to the first supply voltage.

* * * * *